United States Patent
Wiik et al.

(10) Patent No.: US 8,641,088 B2
(45) Date of Patent: Feb. 4, 2014

(54) SIDE-IMPACT AIRBAG MODULE

(75) Inventors: Richard Andrew Wiik, Fort Gratiot, MI (US); Andrew Jack Pitonyak, Auburn Hills, MI (US); Mark Andrew Steinbach, Clawson, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/467,940

(22) Filed: May 9, 2012

(65) Prior Publication Data

US 2012/0286500 A1 Nov. 15, 2012

Related U.S. Application Data

(60) Provisional application No. 61/457,679, filed on May 10, 2011.

(51) Int. Cl.
*B60R 21/213* (2011.01)
*B60R 21/2338* (2011.01)

(52) U.S. Cl.
USPC .................................... 280/730.2; 280/743.2

(58) Field of Classification Search
CPC ................... B60R 21/213; B60R 2021/23386
USPC ............. 280/729, 730.1, 730.2, 743.1, 743.2
See application file for complete search history.

(56) References Cited

U.S. PATENT DOCUMENTS

| | | | | |
|---|---|---|---|---|
| 5,364,124 A | * | 11/1994 | Donegan et al. | 280/730.1 |
| 7,264,267 B2 | * | 9/2007 | Kino et al. | 280/728.2 |
| 7,264,627 B2 | | 9/2007 | Perez | |
| 2005/0206138 A1 | * | 9/2005 | Breuninger et al. | 280/729 |
| 2006/0157958 A1 | | 7/2006 | Heudorfer et al. | |
| 2008/0258441 A1 | * | 10/2008 | Takimoto et al. | 280/730.1 |
| 2009/0058052 A1 | * | 3/2009 | Ford et al. | 280/730.1 |

* cited by examiner

*Primary Examiner* — Joseph Rocca
(74) *Attorney, Agent, or Firm* — Foley & Lardner LLP

(57) ABSTRACT

A side curtain air bag module for a motor vehicle includes an inflatable cushion, an inflator, and a tether. The inflatable cushion includes an inlet and an inflatable portion, the inflatable portion including an inboard layer and an outboard layer. The inflator is in fluidic communication with the inlet and is configured to inflate the inflatable cushion. The tether includes a first end coupled to the inflatable cushion at a first coupling location on an inboard side of the inflatable cushion. During inflation, the tether is configured to be in tension prior to an upper portion of the inboard layer being in tension, the upper portion of the inboard layer extending generally upward from the first coupling location.

21 Claims, 9 Drawing Sheets

SIDE-IMPACT AIRBAG MODULE

CROSS-REFERENCE TO RELATED PATENT APPLICATIONS

This application claims the benefit of and priority to U.S. Provisional Patent Application No. 61/457,679, filed on May 10, 2011, which is incorporated by reference herein in its entirety.

BACKGROUND

The present disclosure relates generally to the field of airbag modules for use in vehicles, such as motor vehicles. More specifically, this disclosure relates to side-curtain airbag modules configured to avoid the trim of a pillar or other structure during deployment to improve occupant restraint.

BRIEF DESCRIPTION OF THE DRAWINGS

FIG. 3 is a side view of the inboard side of an airbag cushion shown in the flat and without a tether.

SUMMARY

Figure 1:
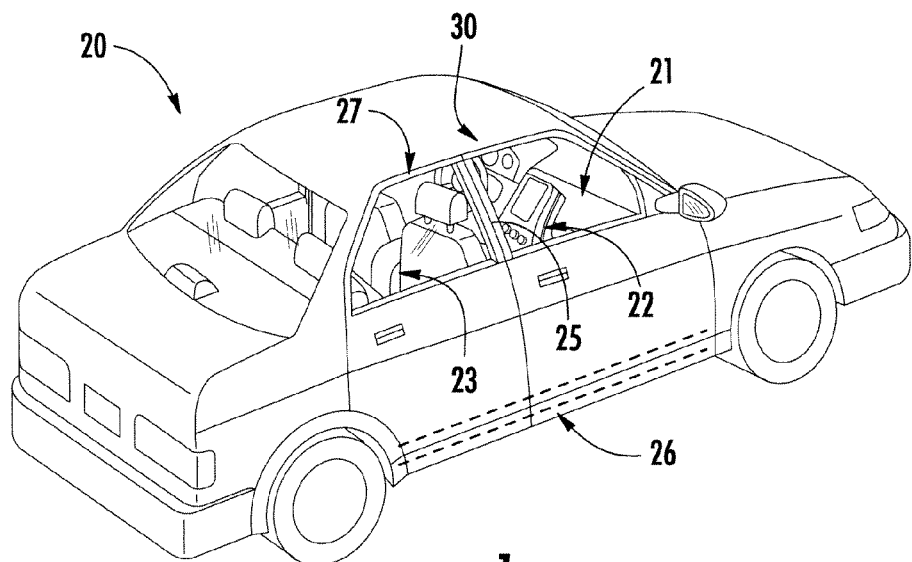
FIG. 1 is a perspective view of a motor vehicle with an exemplary embodiment of a side-curtain airbag module shown stored in the roof-rail of the vehicle.

According to an exemplary embodiment, a side curtain air bag module for a motor vehicle includes an inflatable cushion, an inflator, and a tether. The inflatable cushion includes an inlet and an inflatable portion, the inflatable portion including an inboard layer and an outboard layer. The inflator is in fluidic communication with the inlet and is configured to inflate the inflatable cushion. The tether includes a first end coupled to the inflatable cushion at a first coupling location on an inboard side of the inflatable cushion. During inflation, the tether is configured to be in tension prior to an upper portion of the inboard layer being in tension, the upper portion of the inboard layer extending generally upward from the first coupling location.

According to an exemplary embodiment, a side curtain air bag module for a motor vehicle includes an inflatable cushion and a strap. The strap includes a first end coupled to the inflatable cushion at a first coupling location on an inboard side of the inflatable cushion. The side curtain air bag module is configured to be mounted to a vehicle in a position at least partially above a structure of the vehicle. During an initial stage of deployment, the inflatable cushion is configured to have a trajectory generally downward toward the structure. During a second stage of deployment, the strap is configured to alter the trajectory of the inflatable cushion in an inboard direction relative to the vehicle.

DETAILED DESCRIPTION

Side-curtain airbags (SCABs) are located in vehicles, such as motor vehicles, for restraining an occupant to avoid the occupant from directly impacting other vehicle components, such as a door assembly or a pillar assembly, and for reducing the impact forces on the occupant. SCABs are typically configured to provide restraint to outboard positioned vehicle occupants, such as those adjacent to door assemblies, however, SCABs may be used to provide restraint to any vehicle occupant located in any seating row (e.g., first, second, third) in the vehicle.

A SCAB module or system may include an airbag cushion having at least one inflatable chamber or portion, which deploys during a vehicle event triggering deployment of the SCAB, whereby inflation gas is rapidly pushed into the inflatable chamber of the airbag cushion by an inflator or other suitable device. The inflator may use a pyrotechnic device to generate inflation gas almost instantaneously and to push the inflation gas at a high volumetric flow rate into the inflatable chamber of the airbag cushion. A single side-curtain airbag may be configured to provide restraint to more than one vehicle occupant. For example, a SCAB module may include an airbag cushion configured with one inflatable chamber that provides restraint to more than one vehicle occupant, or may include an airbag cushion configured with more than one inflatable chamber, whereby different chambers may provide restraint to different vehicle occupants.

A SCAB module is generally stored within and deployed from the roof-rail (i.e., the portion of the vehicle provided between the top of the door frame and the roof assembly) of the vehicle. Side-curtain airbags are typically manipulated into a stored configuration through a process of folding and rolling to compact the airbag in order for the airbag to fit into the small volume (and small cross-section) of the vehicle roof rail and to aid vehicle installation of the airbag module. After vehicle installation, the airbag module may be covered, such as by a roof-liner or head-liner, to provide improved interior vehicle aesthetics.

Vehicles are configured with pillars that join the roof assembly to the vehicle, and typical vehicles include three such pillars on each side of the vehicle, which are symmetrically configured from the three pillars on the opposite side of the vehicle. The first pillars (or A-pillars) are generally provided forward in the vehicle between the windshield and the front door assembly, whereby the A-pillar extends from a front panel (e.g., front-quarter panel) and/or hood to the roof assembly. The second pillars (or B-pillars) are generally provided centrally in the vehicle between the front and rear door assemblies, such as for a four-door sedan, whereby the B-pillar may extend from the floor assembly to the roof assembly. The third pillars (or C-pillars) are generally provided rearward in the vehicle between the rear window and the rear door assembly, whereby the C-pillar may extend from a rear panel (e.g., rear-quarter panel) and/or trunk to the roof assembly.

The pillars are typically configured to be high strength for safety of the occupants. The pillars are configured to be strong enough to resist buckling and/or bending, such as during a vehicle rollover event, and accordingly are typically made of steel or other high-strength materials with cross-sections, such as C-shaped cross-sections, having high moments of inertia that provide high bending and/or buckling resistance. The strength requirement of the pillar, especially the B-pillar, causes the pillar to often have a relatively large cross-section. The desire to keep exterior surfaces of the vehicle flush for aesthetic purposes, leads the design of the pillar to have the increased section protrude in the interior direction (i.e., toward the center of the vehicle). This protruding section induces the vehicle manufacturers to include trim and/or other members to cover the pillar on the interior side of the vehicle to improve the interior vehicle aesthetics.

Figure 5:
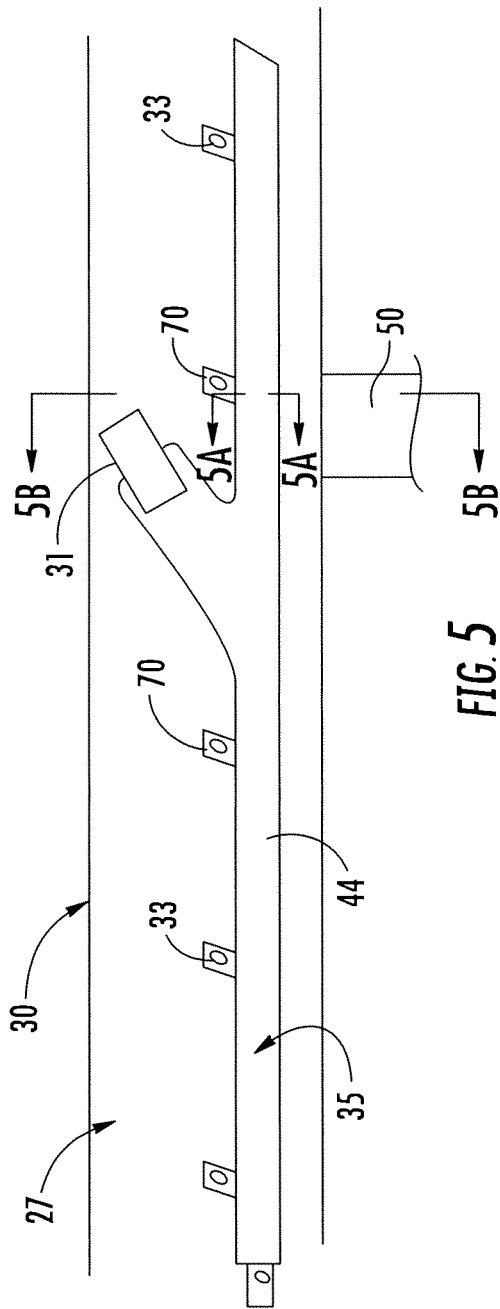
FIG. 5 is a partial side view of a vehicle including an airbag module illustrated in the stored configuration according to an exemplary embodiment.
Figure 5A:
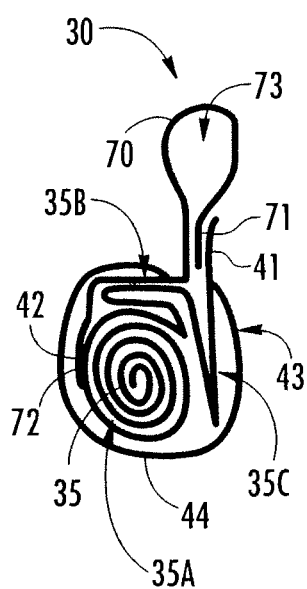
FIG. 5A is a cross-sectional schematic view of the airbag module of FIG. 5.

The trim or other members used to cover the pillar (e.g., B-pillar) to improve aesthetics generally are made of a polymer or other similar material, and will be configured to include a C-shaped (or other suitable) cross-section that forms an inner channel that the pillar occupies after installation of the trim cover. FIGS. 5 and 5A illustrate an exemplary embodiment of a trim cover 50 surrounding the steel B-pillar 25. The shape of the trim cover coupled with the shape of the B-pillar form a lip that protrudes inwardly toward the interior of the vehicle from just below the roof-rail, which is configured to house or store the SCAB module. This inwardly protruding lip can be problematic. For example, this lip may serve as a catch to a SCAB deploying from the roof-rail, causing the cushion deployment to be delayed or the deployment trajectory of the cushion to be influenced.

A SCAB is often rolled (for storage) in an outboard direction to have a substantially downward deployment trajectory that substantially follows the contour of the door and window assembly as the cushion extends and unfolds downwardly. This configuration avoids having the cushion deploy in a lateral or quasi-lateral direction, such as in an oblique direction, substantially toward the occupant inducing relative higher impact (or "punch") forces upon contact with the occupant due to higher lateral forces from the lateral acceleration of the deploying airbag cushion induced by higher internal airbag pressure caused by inflation gas. However, the lip formed by the trim cover and B-pillar may delay and/or influence the deployment trajectory of the airbag cushion by acting as a catch.

The airbag modules described herein are configured to have an influenced deployment to avoid the lip or other impediment formed by the pillar (e.g., B-pillar), trim cover, or other structure, such that the side-impact airbag cushion deploys in an undelayed and unimpeded manner. Once deployed beyond the lip, the airbag modules described herein may be further configured to deploy in an approximately downward direction along the interior of the vehicle in order to reduce the lateral and quasi-lateral forces to reduce the impact forces on the restrained occupant. For example, as discussed in further detail below, the air bag module may include a tether (e.g., a strap or tether panel) that functions to influence the trajectory of the airbag cushion to prevent or minimize delayed or impeded motion that might otherwise occur due to the pillar, trim cover, or other structure. The air bag cushion may initially deploy with a trajectory generally inboard, and the tether functions to subsequently alter the trajectory of the airbag cushion in a generally downward direction.

With reference to FIG. 1, an exemplary embodiment of a motor vehicle 20 is illustrated and includes an interior compartment 21 configured to include one or more occupants (not shown). According to an exemplary embodiment, the interior compartment 21 includes a forward seating position 22 to provide seating to a forward occupant (not shown) and a rearward seating position 23 to provide seating to a rearward occupant (not shown). The vehicle 20 further includes a roof-rail 27 provided between the roof and the door assemblies (e.g., the front and rear passenger doors), a structural (or frame) member 26, and a pillar (e.g., B-pillar) 25 provided between the front and rear door assemblies extending a length that is between the roof-rail 27 and the structural member 26.

According to an exemplary embodiment, the vehicle 20 includes a side-curtain airbag module 30 stored within and configured to deploy from the roof-rail 27 of vehicle 20. The SCAB module 30 may provide occupant restraint to at least one passenger or occupant during airbag deployment. According to an exemplary embodiment, the SCAB module 30 is configured to provide restraint to at least one occupant located on the passenger-side of the vehicle 20, during an airbag deploying event. According to another exemplary embodiment, the SCAB module is configured to provide restraint to at least one occupant located on the driver-side of the vehicle 20, during an airbag deploying event. Those skilled in the art will recognize that the airbag modules disclosed herein can be included within any vehicle configured to include an occupant and may be used to restrain and/or otherwise cushion any occupant (e.g., driver, front passenger, rear passenger). It should be noted that the airbag modules disclosed and illustrated herein are not meant as limitations.

Figure 2:
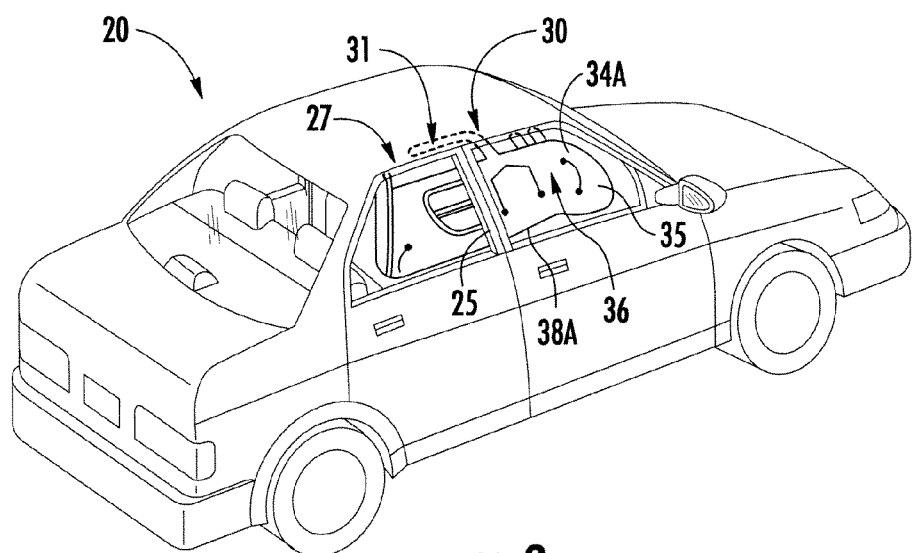
FIG. 2 is a perspective view of a motor vehicle with an exemplary embodiment of a side-curtain airbag module shown deployed or inflated from the roof-rail of the vehicle.

With reference to FIG. 2, the motor vehicle 20 is illustrated with the SCAB module 30 deployed (or inflated) from the roof-rail 27 to a position provided between the occupants (not shown) and the interior surfaces of the door assemblies. The SCAB module 30 is triggered by a dynamic vehicle event, such as a rollover or side impact, whereby vehicle sensors recognize the vehicle event and communicate to a control device or module, which in turn initiates deployment of the airbag. According to an exemplary embodiment, the deployed SCAB module 30 provides restraint and/or cushioning to the front and rear occupants located on the passenger-side of vehicle 20. The SCAB module 30, for example, restrains or cushions the occupants to prevent contact with the interior of the door assemblies located on the passenger-side of the vehicle 20, with the B-pillar 25 provided between the front and rear door assemblies, and/or with other vehicle 20 components with a relative high force created by a relative high acceleration of the occupants induced by the sudden deceleration of the vehicle 20.

According to an exemplary embodiment, the SCAB module 30 includes a plurality of mounting members 33 configured to couple the module to the roof-rail 27 of the vehicle 20, an airbag cushion 35 having an inflatable chamber 36 configured to inflate to provide cushioned restraint to an occupant during airbag deployment, and an inflator 31 to provide inflation gas to inflate the inflatable chamber 36 of the cushion 35. The inflator 31 may be configured using any known or future developed methods, and may include any device, such as a pyrotechnic device, for producing inflation gas to inflate the airbag cushion 35.

According to an exemplary embodiment, the mounting members 33 are made from high strength woven nylon separately formed from the panels 34 of the airbag cushion 35 then connected at one end to the airbag cushion 35 or module 30 and connected at another end to the vehicle 20, such as the roof-rail 27, through any suitable now known or future developed method (e.g., stitching, adhesive, fastener, etc.). The mounting members 33 may be fabric straps, steel or composite brackets, or made from any suitable material and form any suitable shape. According to another exemplary embodiment, the mounting members 33 are tabs (or loops) integrally formed with the airbag cushion 35 from the panels 34 of the cushion. The mounting members 33 couple the SCAB module 30 to the vehicle 20, such as the roof-rail 27. The mounting member 33 may include an opening for receiving a fastener (or other retaining member).

Upon being triggered to deploy, the inflator 31 inflates the airbag cushion 35, which breaches the roof-rail 27 (in which it is stored in) due to the increasing high internal pressure caused by the generated inflation gas. The airbag cushion 35 unfolds with the leading edge of the deployment 38A of the airbag cushion moving away from the roof-rail 27, the inflator 31, and the trailing edge of deployment of the cushion (e.g., mounting members 33) in a direction substantially downward and along the interior surface of the door assemblies. According to an exemplary embodiment, the final deployed location of the airbag cushion 35 is positioned between the door assemblies and the occupants (see, e.g., FIG. 2).

According to another exemplary embodiment, vehicle 20 includes two SCAB modules stored within the passenger-side roof-rail 27. The first SCAB module is configured to deploy to restrain the front occupant located on the passenger-side of the vehicle to prohibit the front occupant from directly impacting the interior of the front door assembly as well as the B-pillar. The second SCAB module is configured to deploy to restrain the rear occupant located on the passenger-side of the vehicle to prohibit the rear occupant from directly impacting the interior or the rear door assembly as well as the B-pillar.

Figure 3:
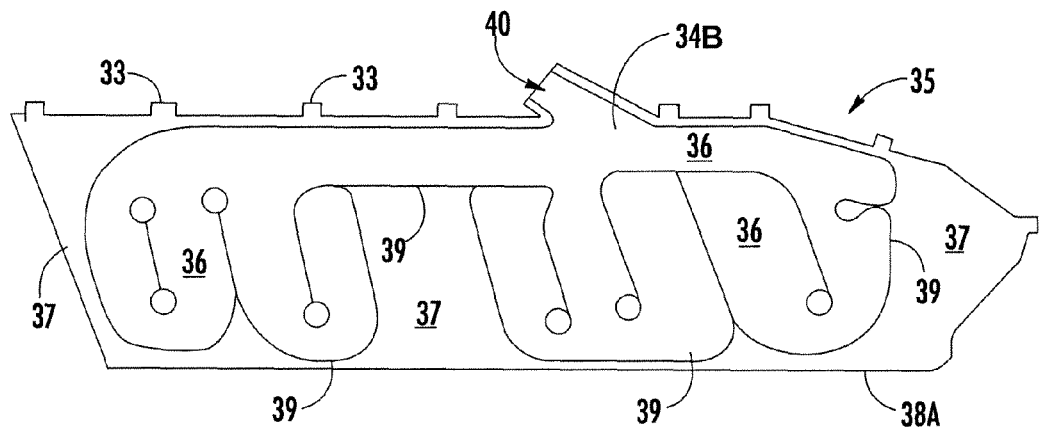
FIG. 3 is a side view of the outboard side of an airbag cushion shown in the flat and without a tether.
Figure 4:
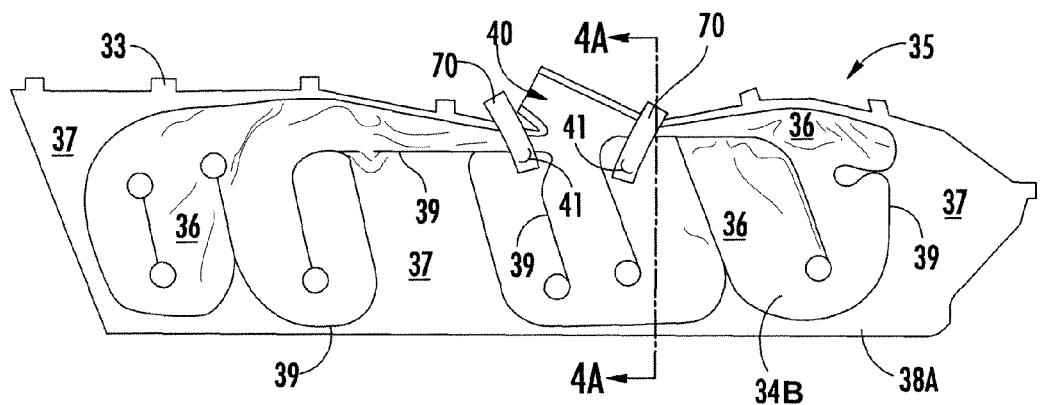
FIG. 4A is a cross-sectional schematic view of the airbag cushion of FIG. 4.
FIG. 4B is a cross-sectional schematic view of an airbag cushion according to another exemplary embodiment.
FIG. 4C is a cross-sectional schematic view of an airbag cushion according to another exemplary embodiment.
FIG. 4D is a cross-sectional schematic view of an airbag cushion according to another exemplary embodiment.
FIG. 4E is a cross-sectional schematic view of an airbag cushion according to another exemplary embodiment.
Figure 4A:
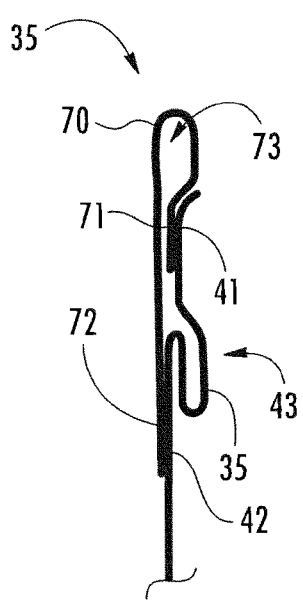
Figure 4B:
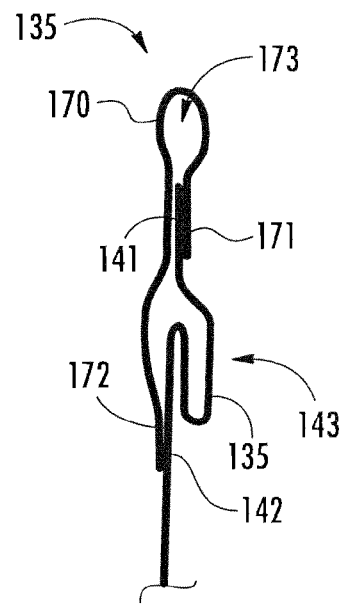
Figure 4C:
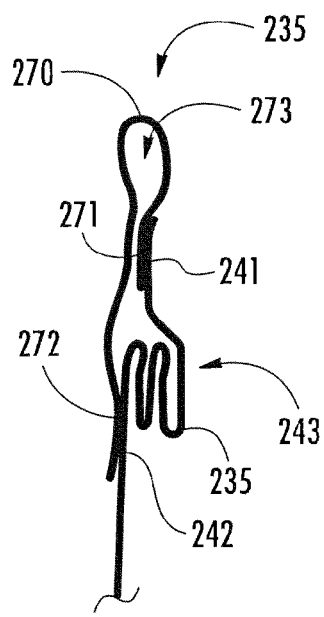
Figure 4D:
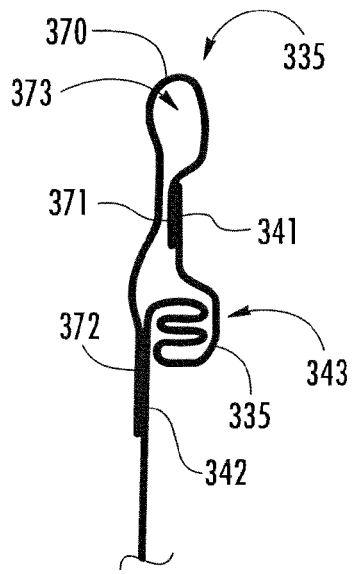
Figure 4E:
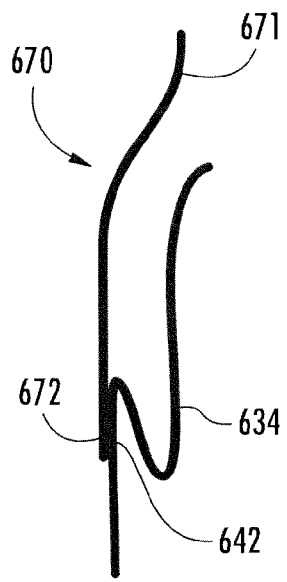

With reference to FIGS. 3-4E, an exemplary embodiment of an airbag cushion 35 for use in a SCAB module 30 is illustrated. FIG. 3 shows the airbag cushion 35 in the flat, prior to any folding or rolling of the cushion. The airbag cushion 35 may be formed from one or more airbag panels 34 coupled together through conventional methods (e.g., stitching, adhesive) at seams 39 to form at least one inflatable chamber 36 configured to receive inflation gas from the inflator during deployment. According to an exemplary embodiment, the airbag cushion 35 is formed from an outer or outboard panel or layer 34A and an inner or inboard panel or layer 34B connected together through a plurality of seams 39. The seams 39 may form one or more non-inflatable portions 37 on the airbag cushion 35, whereby the non-inflatable portions 37 are configured not to receive inflation gas during airbag deployment.

According to an exemplary embodiment, the airbag panels 34 forming the airbag cushion 35 are made from conventional high strength material (e.g., woven nylon fabric) and trimmed in the flat to form a substantially rectangular shape. According to other embodiments, the panels may be made from any suitable material and may form any suitable shape, which may vary to accommodate different vehicle configurations. The airbag panels 34 forming the airbag cushion 35 may be coated with a coating (e.g., silicone) to prohibit the escape of inflation gas, during deployment, through the porosity of the airbag panels. The seams 39 may be sealed with a sealant to prohibit the escape of inflation gas due to separation of the seam caused by separation forces from the high internal pressure in the cushion during deployment.

The airbag cushion 35 includes an inflator connection (or inlet) 40, which allows the inflator 31 to couple to the cushion 35 so that upon deployment, inflation gas is pushed through the inflator inlet 40 and into the inflatable chamber 36. According to an exemplary embodiment, the inlet 40 is integrally formed with the panels 34 forming the airbag cushion 35. According to other embodiments, the inlet may be formed separately then connected to the airbag cushion 35.

The inflatable chamber 36 of the airbag cushion 35 may include pockets or sub-chambers that are formed by seams 39 (or stitches). The pockets may be fluidly connected to other pockets or sub-chambers so that inflation gas from the inflator 31 may pass through a portion of the inflatable chamber 36 into the various pockets. The pockets of the inflatable chamber 36 may be located on the cushion 35 in a configuration to provide optimal restraint to one or more occupants, and the location of the pockets may be varied to accommodate different vehicle requirements or configurations. Further, the seams 39 may divide the pockets into multiple pockets, which may be to influence the deployment sequence of the cushion.

According to the exemplary embodiment shown in FIG. 4, the airbag module 30 further includes a connecting strap 70 that is separately formed from the panels 34 of the airbag cushion 35 and couples to the airbag cushion 35 to provide tension to the cushion during airbag deployment to influence deployment trajectory. The connecting strap 70 is made from high strength woven nylon fabric in the form of an elongated strap and includes a first end 71 and a second end 72. As shown in the cross-sectional schematics of FIGS. 4A-4E, the connecting strap 70 may be provided in various configurations, for example, based on the number, orientation, coupling location, and coupling method of the one or more straps 70 relative to the airbag cushion 35 and a structure of the vehicle.

According to the exemplary embodiment shown in FIG. 4A, the first end 71 of the connecting strap 70 is folded over onto a portion of the strap 70 located between the first and second ends 71, 72, thereby forming a loop 73. The loop 73 may connect to the vehicle and may include a feature, such as an opening, to facilitate coupling of the loop 73 to the vehicle, such as to the roof-rail, to or around the inflator 31, or to or around another generally fixed structure of the vehicle.

The first end 71 of the strap 70 is coupled, such as by stitching, to a portion of the cushion 35 at a first connection or location 41. According to an exemplary embodiment, the connection 41 coupling the first end 71 of the strap 70 to the cushion 35 couples only the first end 71 of the strap 70 to a first portion or location 41 of the cushion 35. According to another exemplary embodiment, the connection 41 couples the first portion or coupling location of the cushion 35 to both the first end 71 of the strap 70 and the portion of the strap 70 adjacent to the first end 71. As shown in FIG. 4A, the first end 71 of the strap 70 may be provided between the first portion or coupling location 41 of the cushion 35 and the middle portion of the strap between the first and second ends 71, 72 (i.e., such that the first end 71 is coupled to the cushion 35 on an inboard side of the cushion 35). Alternatively, as shown in FIG. 4B, the first portion or coupling location 141 of the cushion may be provided between the first end 171 and the portion of the strap 170 (i.e., the loop or middle portion 133) between the first and second ends 171, 172 (i.e., such that the first end 171 is coupled of the cushion on an outboard side of the cushion 135.

The second end 72 of the strap 70 is coupled to another portion of the cushion 35 at a second connection or coupling location 42. According to an exemplary embodiment, the connection 41 couples the second end 72 of the strap 70 to one or more layers 34A, 34B of the cushion 35 at the second portion or coupling location 42 of the cushion 35 on an inboard side of the airbag cushion 35. For example, the second end of the strap 70 may be coupled only to the inboard layer 34B, or may be coupled to both the outboard and inboard layers 34A, 34B (e.g., at a non-inflatable coupling location or deadzone of the airbag cushion). According to other embodiments, the connection 41 may couple the second end 72 of the strap 70 to the second portion of the cushion 35 and may couple other portions of the strap 70 and/or other portions of the cushion 35.

The portion of the airbag cushion 35 between the first and second connections 41, 42 may include one or more than one fold, one or more than one roll, or a combination of folds and rolls. According to the exemplary embodiment shown in FIG. 4A, the airbag cushion 35 includes a Z-fold or pleat 43 between the connections or coupling locations 41, 42. The legs of the pleat 43 may extend substantially in the direction of the length of the cushion 35 and the length the legs extend may be varied. According to other exemplary embodiments, such as those shown in FIGS. 4C and 4D, the airbag cushion 235 may include a fold 243 having a plurality of folds, such as Z-folds, with the legs extending a tailored length along the length of the cushion, or the airbag cushion 335 may include a fold 343 having one or more than one fold with the legs extending a tailored length in a direction transverse to the length of the cushion.

Furthermore, more than one connecting strap 70 may be provided. For example, as shown in FIG. 4, two connecting straps 70 may be provided generally adjacent the inlet (e.g., on opposite sides of the inlet) and may be further configured to couple to the vehicle generally adjacent a pillar (e.g., on opposite sides of the pillar).

According to an exemplary embodiment, the length of the connecting strap 70 between the connections or coupling locations 41, 42 is less then the length of the cushion between the connections 41, 42. That is, the pleats or folds are configured to provide the respective airbag cushions with slack, such that during deployment or inflation, the cushion has slack (e.g., the strap 70 and second connection or coupling location 42 have lengths cooperatively configured for the strap 70 to be placed in tension prior to an upper portion inboard panel or layer 34b generally above the second coupling location 42 being placed in tension). This configuration influences the deployment trajectory of the airbag cushion 35 to inflate and deploy clear of and beyond the trim cover 50 and pillar 25 of the vehicle to avoid catching on the lip formed by the trim cover and pillar during deployment.

According to the exemplary embodiment shown in the schematic cross-section shown in FIG. 4E, a connecting strap 670 is configured to couple at a first end 671 to a generally fixed structure in the vehicle (e.g., the roof rail or other structure of the vehicle itself, a fixed structure of the air bag module mounted in the vehicle, such as the inflator, etc.) and is coupled at a second end 672 at a second connection or coupling location 642 on an inboard side of the airbag cushion 635. The position and length of the strap 470 is configured to create slack in the airbag cushion 635 between the second coupling location 642 and another attachment point of the airbag cushion 635 to a generally fixed point or structure of the vehicle (e.g., a connection to the inflator, such as with the inlet).

Figure 5B:
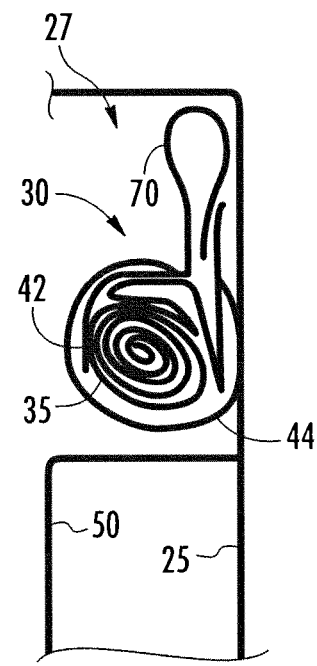
FIG. 5B is a cross-sectional schematic view of the vehicle and airbag module of FIG. 5 prior to deployment.

With reference to FIG. 5 and the schematic cross-sectional view of FIGS. 5A-5B, an exemplary embodiment of the airbag module 30 is shown in the stored configuration and installed in the roof-rail of the vehicle. The airbag module 30 includes an inflatable cushion 35 manipulated into the stored configuration through a process of rolling and folding, an inflator 31 for inflating the inflatable cushion 35, a plurality of mounting mechanisms 33 for connecting the module to the vehicle, two connecting straps 70, and an airbag sock (or cover) 44. The airbag sock 44 may be made of a low strength fabric material that covers the stored cushion 35 to maintain the stored configuration of the cushion 35 prior to deployment of the airbag. The airbag sock 44 may extend substantially the length of the stored cushion 35 or may extend any length greater than or less than the cushion 35. The airbag module may include a plurality of airbag socks that extend a portion of the length of the cushion.

Each of the connecting straps 70 may be configured, as described above, having the first end 71 connected to the first portion or coupling location 41 of the cushion 35 and the second end 72 connected to the second portion or coupling location 42 of the cushion 35. According to an exemplary embodiment, the stored configuration of the airbag cushion 35 includes an outboard (OB) roll 35A, a Z-fold provided above the OB roll 35B, and a V-fold 35C provided adjacent to and outboard of the OB roll 35A and Z-fold 35B. The OB roll 35A may be formed by rolling a portion of the cushion 35 starting from the leading edge of deployment in the outboard direction (for example being rolled up to, before, or past the connection 42 between the strap 70 and the airbag cushion 35). The Z-fold 35B may be formed by folding a second portion of the cushion over a first portion of the cushion, then folding a third portion of the cushion back over the second portion. The V-fold 35C may be formed by a single fold whereby two portions of the cushion are adjacent to each other. Configured in this manner, the pleats and/or folds of the cushion 35 (e.g., Z-fold 35B and V-fold 35C) are configured to at least partially inflate prior to the OB roll 35A, so as to allow for the OB roll 35A to move laterally inboard (e.g., at least partially inboard of the pillar 25 and trim cover 50) prior to inflation of the OB roll 35A. That is, the folded portions of the airbag cushion 35 are at least partially inflated with the outboard and inboard panels 34a, 34b separating and the folds/pleats at least partially unfolding. While FIGS. 5 and 5A-5D are depicted with reference to FIG. 4 and the cross-section schematic of FIG. 4A, the other embodiments depicted in FIGS. 4B-4E may be similarly configured for lateral displacement of an outboard roll 35A prior to unrolling thereof. Furthermore, the airbag cushion may be folded in different manners (e.g., more or fewer folds, more or fewer sets of Z-folds or V-folds, etc.).

Figure 5C:
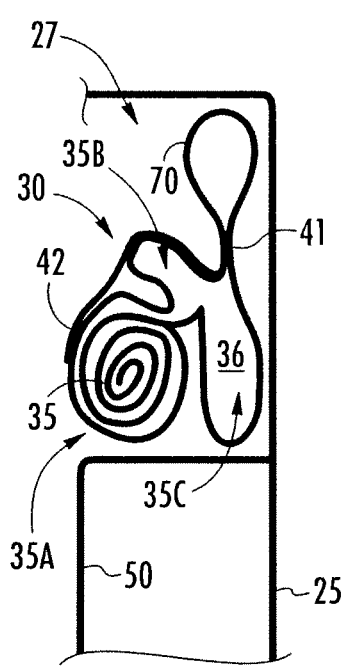
FIG. 5C is a cross-sectional schematic view of the vehicle and airbag module of FIG. 5 during a first stage of deployment.
Figure 5D:
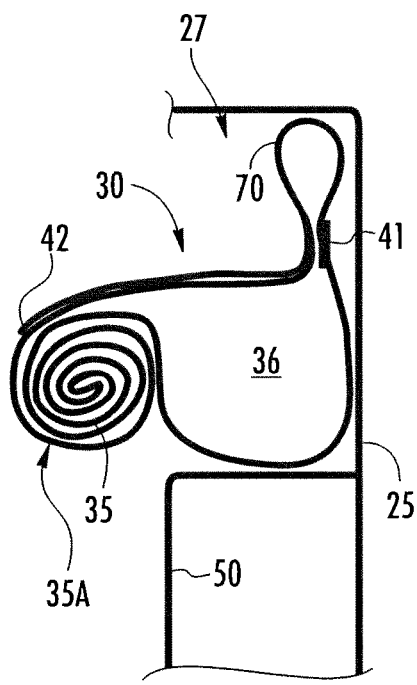
FIG. 5D is a cross-sectional schematic view of the vehicle and airbag module of FIG. 5 during a second stage of deployment.

With reference to FIGS. 5B-5D, the airbag module 30 of FIGS. 5 and 5A is shown installed into the roof-rail 27 of the vehicle and deployed at varying time increments during deployment. FIG. 5B illustrates the airbag module 30 in the stored configuration installed into the roof-rail 27 of the vehicle prior to airbag deployment. The airbag module 30 is provided above the trim cover 50 that covers the pillar 25 of the vehicle. FIG. 5C illustrates the airbag module 30 just after initiation of deployment of the airbag cushion 35. The inflator 31 provides inflation gas that inflates and expands the V-fold and Z-fold of the inflatable chamber 36 of the cushion 35. Early during deployment, the inflation of the inflatable chamber 36 of the cushion 35 puts the strap 70 into tension between the connections 41, 42, which coupled with the continued inflation of the inflatable chamber 36 drives the OB-roll of the cushion 35 in the inboard direction away from the pillar 25 to a location whereby the OB-roll is beyond the lip formed by the trim cover 50, as shown in FIG. 5D. Depending on its length, the strap 70 may instead, or additionally, alter the trajectory the OB-roll of the cushion 35 in a downward direction and/or begin to unroll the OB-roll.

Once the airbag cushion 35 is inwardly or laterally beyond the lip formed by the trim cover 50 and/or the pillar 25, then the OB-roll of the cushion 35 is able to deploy downwardly adjacent to and beyond the lip without catching on the lip. Thus, the airbag cushion 35 deploys without impediment or delay caused by catching on the lip formed by the trim cover 50. The airbag cushion 35 is configured to continue deploying along the interior of vehicle to provide restraint and protection to the occupant positioned adjacent to the airbag cushion. It should be noted that the size and configuration of the cushion, such as the size of the folds or the number of folds, may be altered to tailor the deployment of the airbag cushion to the specific vehicle geometry or parameters, and the illustrations herein are not intended as limitations.

Figure 6:
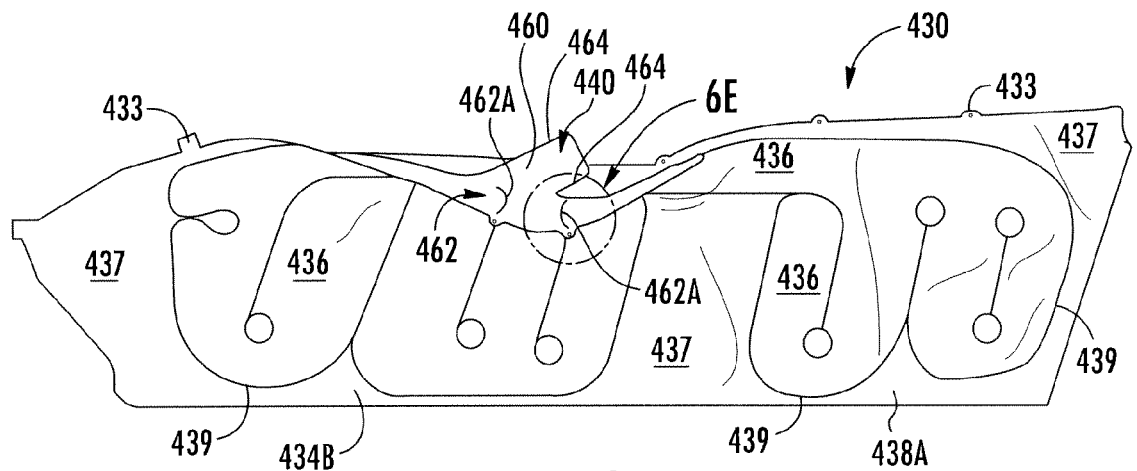
FIG. 6 is a side view of the inboard side of another exemplary embodiment of an airbag cushion shown in the flat and configured for use in an airbag module.
Figure 7:
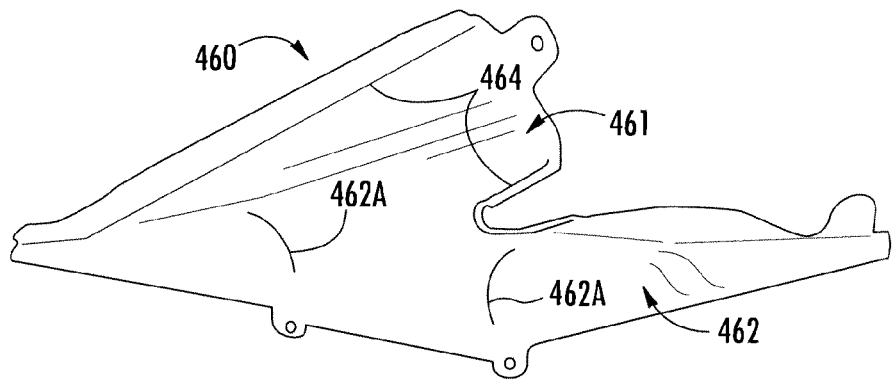
FIG. 7 is a side view of the inboard side of a tether panel according to an exemplary embodiment.

With reference to FIG. 6 and the cross-sectional schematics of FIGS. 6A-6D, another exemplary embodiment of airbag module 430 is shown for providing side-impact protection to the vehicle occupant. The airbag module 430 includes an inflatable airbag cushion 435, an inflator (not shown) to inflate the airbag cushion 435, and a tether panel 460 (shown separately in FIG. 7). According to an exemplary embodiment, the airbag cushion 435 includes an outer panel 434A coupled to an inner panel 434B though stitching at seams 439, which forms an inlet 440, an inflatable portion 436 configured to receive inflation gas from the inflator through the inlet 440, and non-inflatable portions 437 configured not to receive inflation gas. The airbag panels 434A, 434B may be configured as disclosed herein or through any now known or future developed methods. The airbag cushion 435 further includes a plurality of integrally formed mounting members 433, as described herein, and configured to couple the airbag module 430 to the vehicle.

Figure 6E:
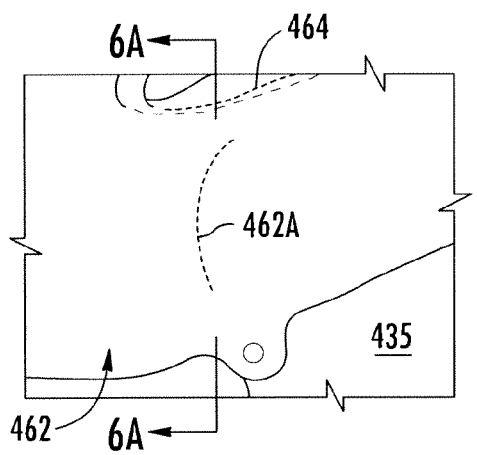
FIG. 6E is a partial view of the inboard side of the airbag cushion of FIG. 6.
Figure 6F:
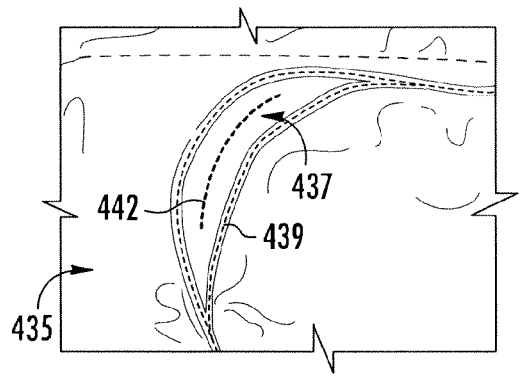
FIG. 6F is a partial view of the outboard side of the airbag cushion of FIG. 6.

According to an exemplary embodiment, the tether panel 460 includes a lower portion 462 having a relative longer length than height. The tether panel 460 includes one coupling locations 462A positioned at any location on the tether panel 460, which are configured to couple to the airbag cushion 435 at corresponding coupling locations 442 thereof. According to an exemplary embodiment, the tether panel 460 two coupling locations 462A that are coupled to the airbag cushion at two corresponding connections or coupling locations 442 of the airbag cushion 435 located in respective non-inflatable portions 437 of the cushion 435 (see, e.g., FIGS. 6E and 6G). This configuration ensures the airbag cushion will tear in the non-inflatable portion 437 of the cushion 435 in the event that the separation forces between the tether panel 460 and the cushion exceed the strength of the connection between respective coupling locations 442, 462A thereof, which prevents escapes of inflation gas, since the tear is in the non-inflatable portion of the cushion opposed to the inflatable portion. It should be noted that the strength of the connection at coupling locations 442, 462A may be tailored, so that the connection releases at a predetermined separation force or so that the connection is stronger than the maximum separation force in order to not release (or separate).

The tether panel 460 may further include an upper portion 461 configured to cover the inlet 440 of the airbag cushion 435. According to an exemplary embodiment, the upper portion 461 has a substantially similar shape as the inlet 440 and is connected to the inlet 440 of the cushion 435 at a seam 464. The seam 464 connecting the upper portion 461 of the tether panel 460 may be configured to have a tailored strength to withstand the desired separation forces between the tether panel 460 and the cushion 435 during airbag deployment. The seam 464 may be configured to have a strength that is greater than or less than the maximum separation forces. This allows the tether panel 460 to provide tension to the cushion 435 during the entire period of deployment of the cushion or during a portion of the deployment of the cushion. According to another exemplary embodiment, the upper portion 461 of the tether panel 460 is configured to couple to the mounting members 433, thereby having the lower portion 462 coupled to the airbag cushion 435 and the upper portion 461 coupled to the mounting members 433.

Figure 6A:
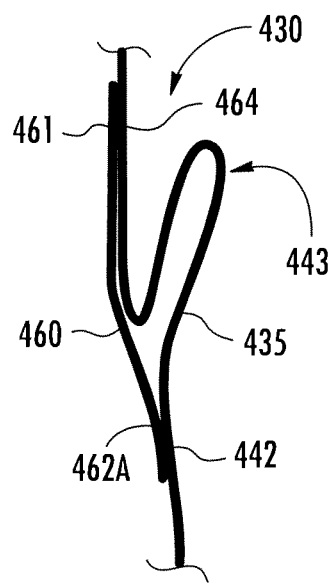
FIG. 6A is a cross-sectional schematic view of the airbag cushion of FIG. 6.
Figure 6B:
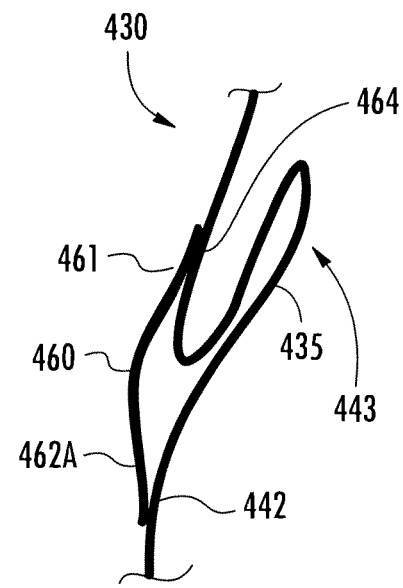
FIG. 6B is a cross-sectional schematic view of an airbag cushion according to another exemplary embodiment.
Figure 6C:
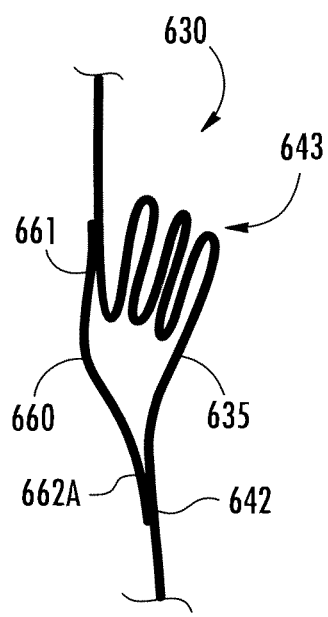
FIG. 6C is a cross-sectional schematic view of an airbag cushion according to another exemplary embodiment.
Figure 6D:
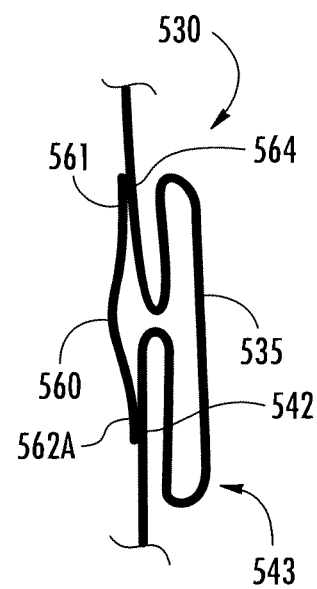
FIG. 6D is a cross-sectional schematic view of an airbag cushion according to another exemplary embodiment.

According to the exemplary embodiment shown in FIGS. 6A-6B, the airbag cushion 435 includes a V-fold 443 located between the connection 462A and seam 464 that couples the tether panel 460 to the airbag cushion 435. According to other embodiments, the fold 643 may be configured as a plurality of V-folds, such as shown in FIG. 6C, the fold 543 may be configured at a T-fold, such as show in FIG. 6D, or may be configured using any suitable fold, roll, or a combination of folding and rolling. The fold, roll, or combination of fold and roll of the cushion located between the connection and seam influences the deployment of the airbag cushion as discussed below.

Figure 8A:
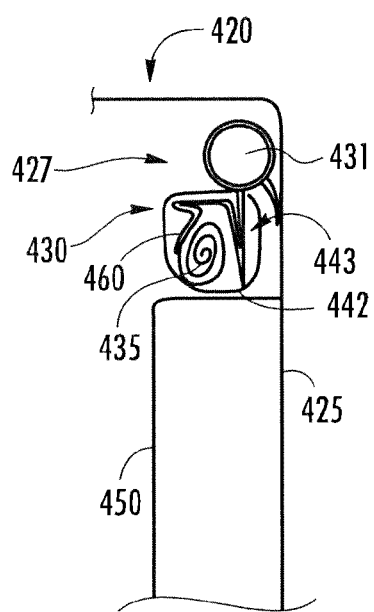
FIG. 8A is a partial cross-sectional schematic of a vehicle and an airbag module according to an exemplary embodiment prior to deployment.

With reference to the cross-sectional schematics in FIGS. 8A-8E, the airbag module 430 is shown installed into and deployed in sequence from the roof-rail 427 of the vehicle 420. FIG. 8A shows the airbag module 430 in the stored configuration prior to deployment, whereby the airbag module 430 is provided above the pillar 425 and the trim cover 450. After coupling the tether panel 460 to the airbag cushion 435, the cushion 435 may be manipulated into the stored configuration through a process of rolling, folding, or a combination of rolling and folding. According to an exemplary embodiment, the cushion 435 is first rolled starting from the leading edge of deployment in the outboard direction to form the outboard roll. The portion of the cushion 435 provided above the outboard roll is then configured as a Z-fold. Another portion of the cushion 435 adjacent to the Z-fold is configured as a V-fold which is then located adjacent to the Z-fold and outboard roll toward the outboard side of the vehicle.

Figure 8B:
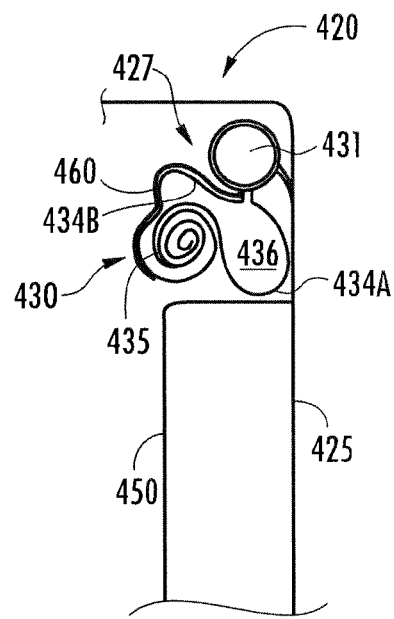
FIG. 8B is a partial cross-sectional schematic of a vehicle and an airbag module according to an exemplary embodiment during a first stage of deployment.
Figure 8C:
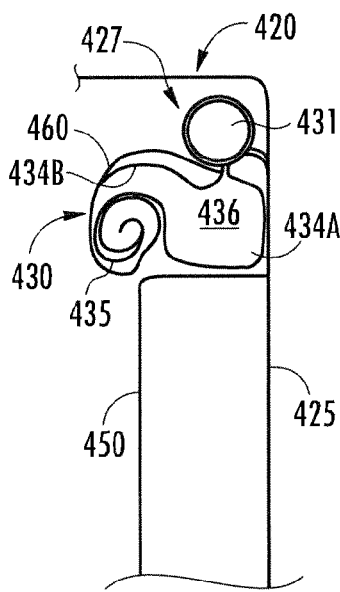
FIG. 8C is a partial cross-sectional schematic of a vehicle and an airbag module according to an exemplary embodiment during a second stage of deployment.
Figure 8D:
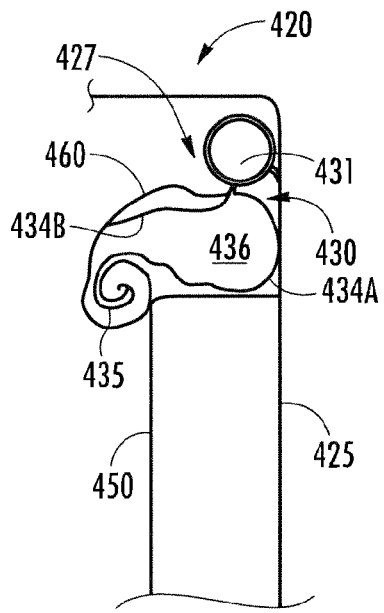
FIG. 8D is a partial cross-sectional schematic of a vehicle and an airbag module according to an exemplary embodiment during a third stage of deployment.
Figure 8E:
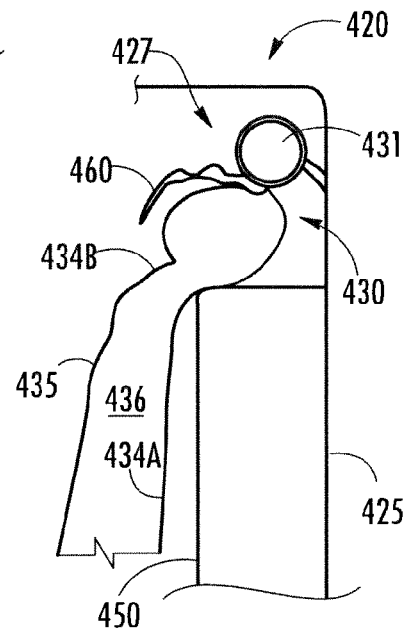
FIG. 8E is a partial cross-sectional schematic of a vehicle and an airbag module according to an exemplary embodiment during a fourth stage of deployment.

FIG. 8B shows the airbag module 430 during the initial stages of airbag deployment, whereby the fold 443 of the cushion 435 located between the connection 462A and the seam 464 that couples the cushion 435 to the tether panel 460 is inflating from inflation gas provided by the inflator 431. The inflating of the fold 443 of the inflatable cushion 436 drives the outboard or main roll in the inboard direction (or away from the pillar 25). As the inflation of the inflatable cushion 436 continues, the tether panel 460 comes into tension, such as shown in FIG. 8C, whereby the tension in the tether panel 460 induces the adjacent (and/or abutting) inner panel 434B of the cushion to pull the outboard roll and uninflated portion of the cushion 435 in the inboard direction beyond the lip formed by the trim cover 450 and pillar 425, since the outer panel 434A of the cushion has a lower tension force relative to the inner panel 434B. The tension from the tether panel 460 and deploying fold of the inflatable cushion 436 drive the outboard roll of the cushion to a location beyond the lip, as shown in FIG. 8D, to allow the outboard roll to inflate downwardly along the interior of the vehicle, including the interior of the trim cover 450, without catching on the lip formed by the trim cover 450 and pillar 425. Thus, the airbag cushion deploys without impediment or delay from the trim cover to a location provided between the occupant and the interior of the vehicle to restrain and protect the occupant.

As shown in 8E, the airbag cushion 35 deploys between the interior of vehicle and the occupant (not shown) in a downwardly or oblique direction to restrain and protect the occupant positioned adjacent to the airbag cushion. Also, it should be noted that the tether panel 460 may be configured to separate from the cushion 435 during deployment to release the tension pulling the cushion in the inboard direction. The time of separation may be tailored to accommodate the specific vehicle configuration or requirements, such as the size (e.g., cross-car width) of the trim cover and pillar. According to an exemplary embodiment, the connection 463 that couples the tether panel 460 to the cushion 435 may release (or separate) to release the tension on the inner panel 434B of the cushion. According to another exemplary embodiment, the seam 464 that couples the tether panel 460 to the cushion 435 may release to release the tension on the inner panel 434B of the cushion. It should be noted that the separation force in which the connection 463 and/or seam 464 releases may be varied and may be tailored to meet specific vehicle requirements.

Figure 9:
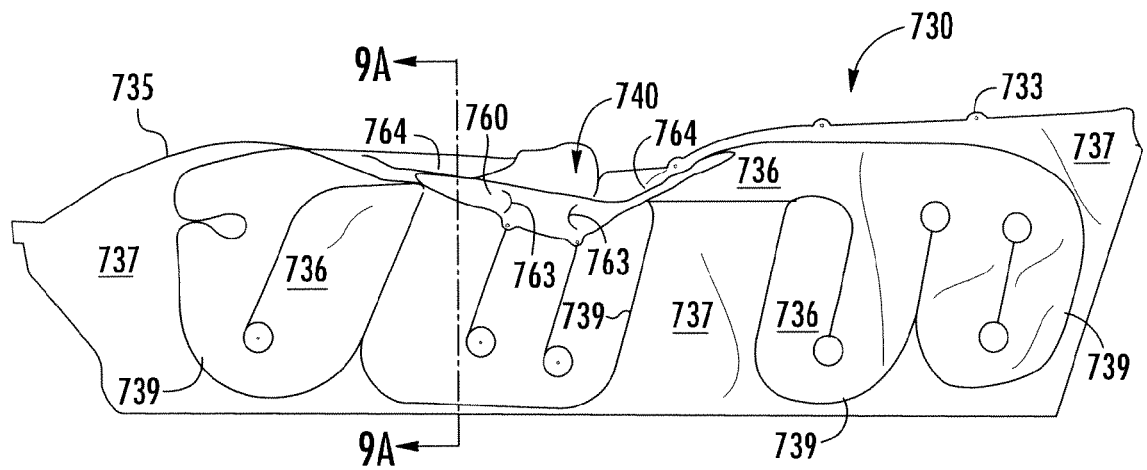
FIG. 9 is a side view of the inboard side of another exemplary embodiment of an airbag cushion shown in the flat and configured for use in an airbag module.
Figure 9A:
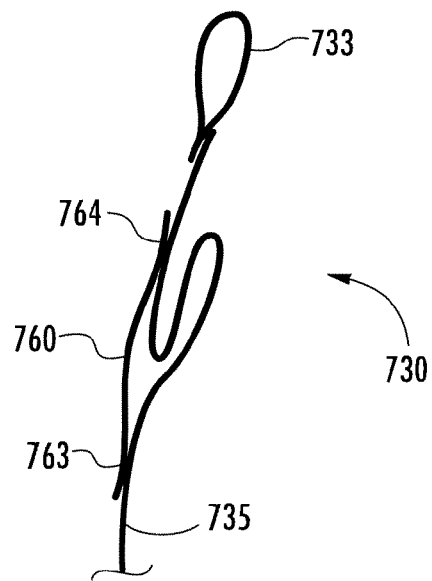
FIG. 9A is a cross-sectional schematic of the airbag cushion of FIG. 9.

With reference to FIG. 9 and the cross-sectional schematic of FIG. 9A, another exemplary embodiment of airbag module 730 is shown for providing side-impact protection to the vehicle occupant. The airbag module 730 includes an inflatable airbag cushion 735, an inflator (not shown) to inflate the airbag cushion 735, and a tether panel 760. According to an exemplary embodiment, the airbag cushion 735 includes an outer panel coupled to an inner panel though stitching at seams 739, which forms an inlet 740, an inflatable portion 736 configured to receive inflation gas from the inflator through the inlet 740, and non-inflatable portions 737 configured not to receive inflation gas. The airbag panels may be configured as disclosed herein or through any now known or future developed methods.

According to an exemplary embodiment, the tether panel 760 couples to the airbag cushion 735 at a connection 763 and a seam 764. The connection 763 couples the lower portion of the tether panel 760 to the airbag cushion, while the seam 764 couples the upper portion of the tether panel 760 to the airbag cushion 735. According to an exemplary embodiment the connection 763 and the seam 764 are configured in non-inflatable portions 737 of the airbag cushion 735. According to another exemplary embodiment, the connection 763 and the seam 764 are configured in inflatable portions 736 of the cushion 735.

According to other exemplary embodiments, the connecting straps and/or the tethers panels may be connected at the lower end to the airbag cushion and at the upper end to a bracket, the inflator, or any other component that suitably fixes the end of the strap and/or tether. The ends of the straps and/or tethers may be connected using tear stitches to allow the connection to uncouple during airbag deployment.

The airbag modules disclosed herein that are configured to influence the deployment of the airbag to avoid catching on the trim cover and/or pillar of the vehicle improve the reliability and repeatability of the airbag deployment, which improve occupant restraint and protection. It should be noted that the airbag modules disclosed herein provide improved airbag deployment without the need for costly pillar ramps. It should also be noted that the airbag modules disclosed herein may be configured similarly to avoid vehicle components other than the trim cover and pillar.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A side curtain air bag module for a motor vehicle, comprising:
    an inflatable cushion having an inlet and an inflatable portion, the inflatable portion including an inboard layer and an outboard layer;
    an inflator in fluidic communication with the inlet and configured to provide inflation gas to the inflatable cushion; and
    a tether having a first end coupled to the inflatable cushion at a first coupling location of the inflatable cushion, and having a second end coupled to the inboard layer of the inflatable cushion at a second coupling location of the inflatable cushion, the second coupling location being positioned between an upper end and a lower end of the inflatable cushion and being positioned closer to the upper end than the lower end of the inflatable cushion;
    wherein a length of the tether between the first end and the second end is less than an upper portion of the inboard layer between the first coupling location and the second coupling location;
    wherein during inflation, the tether is configured to be in tension prior to the upper portion of the inboard layer being in tension, the upper portion of the inboard layer extending generally upward from the second coupling location;
    wherein after inflation, the first coupling location is above the second coupling location; and
    wherein after inflation, the inboard layer and the outboard layer are separated at the second coupling location.

2. The side curtain air bag module of claim 1, wherein the side curtain air bag module is configured to be mounted generally along an upper side of a passenger compartment of the motor vehicle, and the inflatable cushion is configured to inflate from a stored position with a generally downward trajectory, and the tether is configured to alter the trajectory of the inflatable cushion in an inboard direction.

3. The side curtain air bag module of claim 1, wherein the first end of the tether is coupled to the inflatable cushion above the second coupling location.

4. The side curtain air bag module of claim 1, wherein the first coupling location is in a region of the airbag cushion that is configured to be positioned generally proximate a pillar structure of the vehicle.

5. The side curtain air bag module of claim 1, wherein the tether is a panel.

6. The side curtain air bag module of claim 5, wherein the second end of the tether is a lower portion of the tether and is coupled to the inflatable cushion in a third coupling location on an inboard side of the inflatable cushion separately from the second coupling location, the third coupling location being positioned between the upper end and the lower end of the inflatable cushion.

7. The side curtain air bag module of claim 1, wherein the tether is configured for the second end to decouple from the inflatable cushion during inflation of the inflatable cushion.

8. The side curtain air bag module of claim 7, wherein the first coupling location is along a seam that couples the inboard layer to the outboard layer.

9. A side curtain air bag module for a motor vehicle, comprising:
    an inflatable cushion having an inlet and an inflatable portion, the inflatable portion including an inboard layer and an outboard layer;
    an inflator in fluidic communication with the inlet and configured to provide inflation gas to the inflatable cushion; and
    a tether having a first end coupled to the inflatable cushion at a first coupling location on an inboard side of the inflatable cushion;
    wherein during inflation, the tether is configured to be in tension prior to an upper portion of the inboard layer being in tension, the upper portion of the inboard layer extending generally upward from the first coupling location; and
    wherein in a stored position, an upper portion of the inboard layer and the outboard layer are folded, and lower portions of the inboard layer and the outboard layer are rolled together in an outboard direction.

10. The side curtain air bag module of claim 9, wherein the lower portions of the inboard layer and the outboard layer are generally below the first coupling location.

11. The side curtain air bag module of claim 10, wherein the upper portion of the inflatable cushion is configured to at least partially inflate prior to inflation of the lower portion of the inflatable cushion.

12. The side curtain air bag module of claim 10, wherein the upper folded portions of the inboard and outboard layers are configured to at least partially unfold prior to the lower rolled portions of the inboard and outboard layers unrolling.

13. The side curtain air bag module of claim 10, wherein the length of the tether is sufficient to allow the lower rolled portions of the inboard and outboard layers to move inboard a predetermined distance prior to unrolling.

14. The side curtain air bag module of claim 13, wherein the side curtain air bag module is configured to mount to a vehicle at least partially above a structure of the vehicle, and the predetermined distance corresponds to a width of the structure.

15. The side curtain air bag module of claim 13, wherein the structure of the vehicle is a trim structure.

16. A side curtain air bag module for a motor vehicle, comprising:
    an inflatable cushion including an inboard panel and an outboard panel; and
    a strap having a first end coupled to the inflatable cushion at a first coupling location on an inboard side of the inflatable cushion;
    wherein the side curtain air bag module is configured to be mounted to a vehicle in a position at least partially above a structure of the vehicle;
    wherein during an initial stage of deployment, the inflatable cushion is configured to have a trajectory generally downward toward the structure;

wherein during a second stage of deployment after the initial stage, the strap is configured to alter the trajectory of the inflatable cushion in an inboard direction relative to the vehicle to a position at least partially inboard of the structure; and wherein during a third stage of deployment after the second stage, the airbag cushion is configured to have a generally downward trajectory to a height lower than at least a portion of the structure.

17. The side curtain air bag module of claim 16, wherein the strap comprises a second end, and the second end is configured to be coupled to a fixed structure in the vehicle at a second coupling location.

18. The side curtain air bag module of claim 17, wherein the inflatable cushion includes an inboard panel and an outboard panel; and wherein during deployment of the cushion, the strap is configured to be in tension between the first coupling location and the second coupling location prior to an upper portion of the inboard panel being in tension, the upper portion extending generally upward from the first coupling location.

19. The side curtain air bag module of claim 18, further comprising a second strap;

wherein the second strap is coupled to the inflatable cushion at a third coupling location; and is configured to be coupled to the vehicle at a fourth coupling location;

wherein during deployment, the second strap is configured to be in tension between the third coupling location and the fourth coupling location prior to a second upper portion of the inboard panel being in tension, the second upper portion extending generally upward from the third coupling location.

20. The side curtain air bag module of claim 19, wherein the inflatable cushion includes an inlet, the first coupling location is forward of the inlet, and the third coupling location is aft of the inlet.

21. The side curtain air bag module of claim 19, wherein the air bag module is configured to be mounted in the vehicle, the first coupling location being positioned forward of a pillar structure of the vehicle and the third coupling location being positioned aft of the pillar structure.

* * * * *